United States Patent
Okamoto et al.

(10) Patent No.: US 6,937,441 B2
(45) Date of Patent: Aug. 30, 2005

(54) DISC DRIVE SUSPENSION HAVING FEATURES ENABLING RELATIVE POSITIONING OF LOAD BEAM AND FLEXURE

(75) Inventors: Hiroshi Okamoto, Yokohama (JP); Hideki Kashima, Aiko-gun (JP); Chihiro Kono, Yokohama (JP); Takashi Horiuchi, Aiko-gun (JP)

(73) Assignee: NHK Spring Co., Ltd., Yokohama (JP)

( * ) Notice: Subject to any disclaimer, the term of this patent is extended or adjusted under 35 U.S.C. 154(b) by 0 days.

(21) Appl. No.: 10/916,997

(22) Filed: Aug. 12, 2004

(65) Prior Publication Data

US 2005/0013052 A1 Jan. 20, 2005

Related U.S. Application Data

(62) Division of application No. 10/179,869, filed on Jun. 25, 2002, now Pat. No. 6,813,119.

(30) Foreign Application Priority Data

Dec. 7, 2001 (JP) ........................................ 2001-374534

(51) Int. Cl.[7] ............................................ G11B 21/24
(52) U.S. Cl. ............................... 360/245.2; 360/244.5; 360/245.9; 360/245.4; 360/294.1
(58) Field of Search .......................... 360/245.2, 244.5, 360/245.9, 294.1, 294.6

(56) References Cited

U.S. PATENT DOCUMENTS

| | | |
|---|---|---|
| 5,355,267 A | 10/1994 | Aoyagi et al. |
| 5,920,444 A | 7/1999 | Heeren et al. |
| 6,055,133 A | 4/2000 | Albrecht et al. |
| 6,154,343 A | 11/2000 | Khan et al. |
| 6,313,971 B1 | 11/2001 | Takagi et al. |
| 6,466,412 B1 | 10/2002 | Adams et al. |
| 2003/0011935 A1 | 1/2003 | Saito et al. |

OTHER PUBLICATIONS

Related U.S. Appl. No. 10/916,996, filed Aug. 12, 2004; Inventor: H. Okamoto et al.; Title: Disc Drive Suspension.

Primary Examiner—Craig A. Renner
(74) Attorney, Agent, or Firm—Frishauf, Holtz, Goodman & Chick, P.C.

(57) ABSTRACT

An extending portion extending from the proximal portion of the load beam of a disc drive suspension has a first hole in which a first positioning pin can be inserted and a second hole in which a second positioning pin can be inserted. The first hole has an elongated shape that allows the extending portion to move relatively to the first positioning pin in a width direction. The second hole is a circular large hole that allows the extending portion to move relatively to the second positioning pin in the width direction and an axial direction. A third hole and a fourth hole are formed in a flexure. The third hole has an elongated shape that allows the flexure to move relatively to the first positioning pin in the axial direction. The fourth hole has an elongated shape that allows the flexure to move relatively to the second positioning pin.

2 Claims, 10 Drawing Sheets

DISC DRIVE SUSPENSION HAVING FEATURES ENABLING RELATIVE POSITIONING OF LOAD BEAM AND FLEXURE

CROSS-REFERENCE TO RELATED APPLICATIONS

The present application is a Divisional Application of U.S. application Ser. No. 10/179,869, filed Jun. 25, 2002, now U.S. Pat No. 6,813,119, and is based upon and claims the benefit of priority of Japanese Patent Application No. 2001-374534, filed Dec. 7, 2001, the entire contents of which are incorporated herein by reference.

BACKGROUND OF THE INVENTION

1. Field of the Invention

The present invention relates to a disc drive suspension incorporated in an information processing apparatus such as a personal computer.

2. Description of the Related Art

Figure 16:
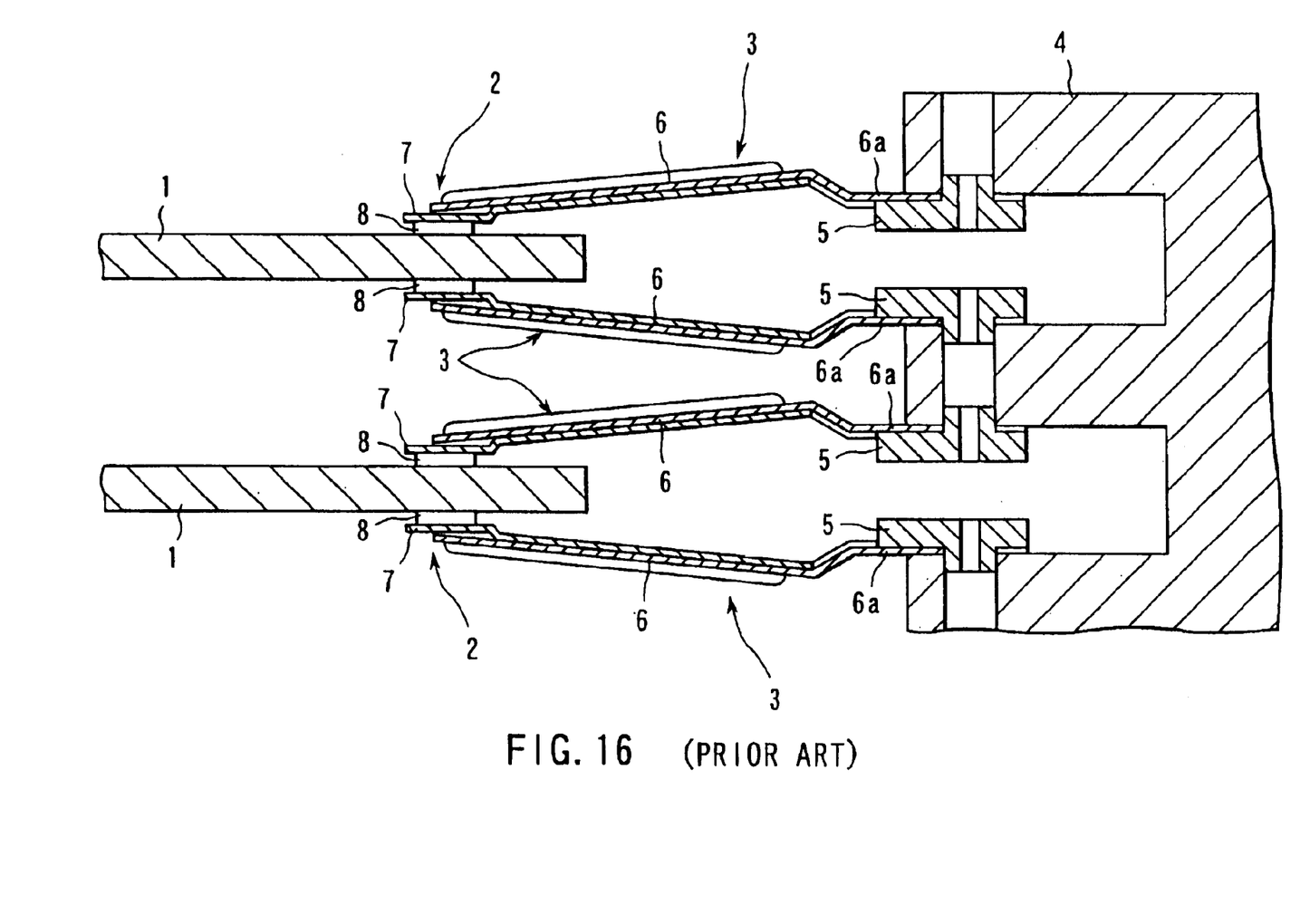
FIG. 16 is a sectional view of a part of a hard disc drive provided with conventional suspensions.

FIG. 16 shows a part of a hard disc drive (HDD). This disc drive comprises a plurality of suspensions 3 that individually support magnetic head portions 2 and actuator arms 4 that are mounted individually with the suspensions. The magnetic head portions 2 serve to record information on the respective recording surfaces of discs 1 for use as recording media and read information from the discs 1. The actuator arms 4 are turned around a shaft (not shown) by means of a positioning motor (not shown).

Each suspension 3 includes a base plate 5, a load beam 6 extending from the base plate 5 toward the head portion 2, a flexure 7, etc. A proximal portion 6a of the load beam 6 is fixed on the base plate 5. The flexure 7 is fixed on the load beam 6 by laser welding. A slider 8 that constitutes the head portion 2 is mounted on the distal end portion of the flexure 7.

The flexure 7, which is provided with a wiring portion, extends from the head portion 2 toward the base plate 5 along the load beam 6. An end portion of the flexure 7 is fixed on an extending portion (not shown) that protrudes sideways from the proximal portion 6a of the load beam 6. External lead wires are connected (bonded) to electrode pads on the end portion of the flexure 7. Before bonding, therefore, the end portion of the flexure 7 must be fixed in advance in a predetermined position on the extending portion.

If necessary, a step forming portion may be formed on the extending portion by press working or the like. If the extending portion is thus formed having the step forming portion, its position and shape are liable to variation. If the end portion of the flexure is fixed in the predetermined position on the extending portion that varies in position and shape, stress such as tensile, compressive, or torsional stress is produced in the flexure. If the stress is produced in this manner, the rolling angle of the flexure cannot be within the range of a tolerance, and exerts a bad influence upon the properties of the suspension.

BRIEF SUMMARY OF THE INVENTION

Accordingly, the object of the present invention is to provide a disc drive suspension in which an end portion of a flexure can be fixed to an extending portion without producing excessive stress such as tensile stress in the flexure.

A suspension of the present invention comprises a load beam, a flexure, and an extending portion formed on a hinge member or the load beam. First and second holes are formed in the extending portion. Further, third and fourth holes are formed in the flexure. A first positioning pin can be inserted into the first and third holes. A second positioning pin can be inserted into the second and fourth holes. These positioning pins are provided on a jig.

The first hole is formed of an elongated shape that allows the extending portion to move relatively to the first positioning pin in a width direction. The second hole is a large circular hole or the like that allows the extending portion to move relatively to the second positioning pin in the width direction and an axial direction. The third hole is an elongated shape that allows the flexure to move relatively to the first positioning pin in the axial direction. The fourth hole is an elongated shape that allows the flexure to move relatively to the second positioning pin in the axial direction. The axial direction described herein is synonymous with the longitudinal direction of the suspension, and the width direction is the width direction of the suspension.

In the disc drive suspension that comprises the load beam, flexure, hinge member, etc., according to the present invention, the respective positions of the extending portion on the hinge member and the flexure can be regulated, and excessive stress such as tensile stress can be prevented from being produced in the flexure.

In the suspension that is formed having the extending portion for fixing an end portion of the wired flexure to a proximal portion of the load beam, according to the present invention, moreover, the respective positions of the extending portion and the flexure can be regulated, and excessive stress such as tensile stress can be prevented from being produced in the flexure.

In the disc drive suspension that comprises the load beam, flexure, hinge member, etc., according to the present invention, furthermore, the respective positions of the extending portion on the load beam and the flexure can be regulated, and excessive stress such as tensile stress can be prevented from being produced in the flexure.

In the present invention, a longitudinal part of the flexure may be designed to pass over a slit formed in the hinge member.

Alternatively, in the present invention, an end portion of the flexure may be formed extending rearward from the base plate mounting portion. According to this invention, a longitudinal intermediate portion of the flexure can be fixed on the extending portion.

In the present invention, moreover, the extending portion on the hinge member or the load beam may be formed having a step forming portion. According to this invention, the step forming portion of the extending portion can prevent excessive stress such as tensile stress from being produced in the flexure despite variation in the accuracy of the extending portion.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the embodiments given below, serve to explain the principles of the invention.

DETAILED DESCRIPTION OF THE INVENTION

A first embodiment of present invention will now be described with reference to FIGS. 1 to 9.

Figure 2:
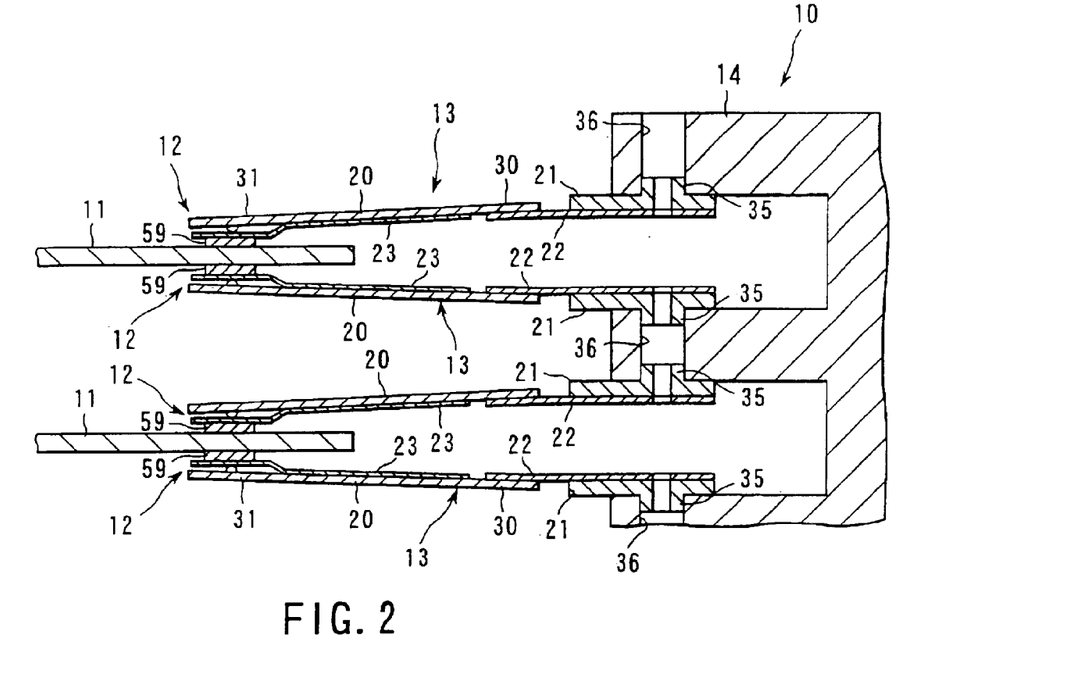
FIG. 2 is a sectional view of a part of a disc drive provided with the suspensions shown in FIG. 1.

A hard disc drive (HDD) 10 shown in FIG. 2 comprises a plurality of discs 11 for use as recording media, a plurality of suspensions 13 having a head portion 12 each, actuator arms 14, etc. Each head portion 12 serves magnetically to record on and read information from the recording surface of each disc 11. Each actuator arm 14 is an example of an arm member to be mounted with each suspension 13. The actuator arms 14 are turned around a shaft (not shown) by means of a positioning motor (not shown).

Figure 1:
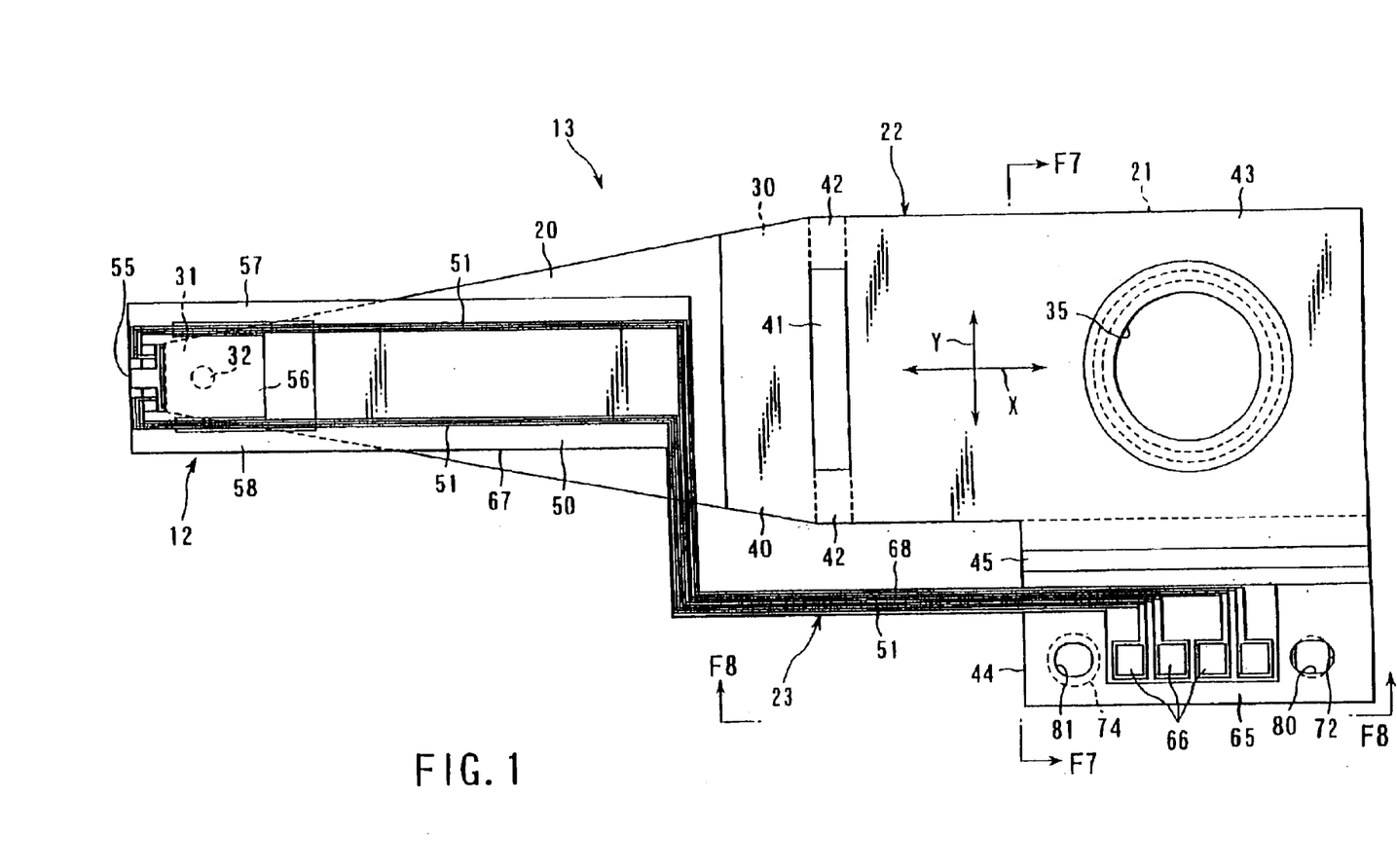
FIG. 1 is a plan view of a disc drive suspension according to a first embodiment of the invention.
Figure 3:
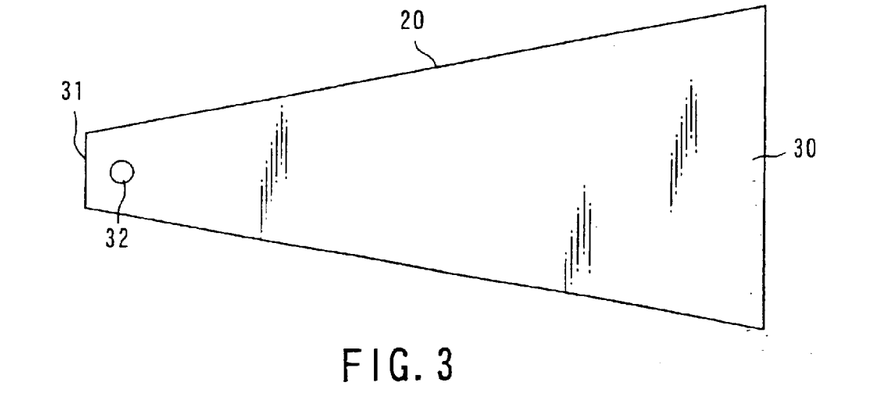
FIG. 3 is a plan view of a load beam of the suspension shown in FIG. 1.

As shown in FIG. 1, each suspension 13 includes a load beam 20, a base plate 21, a hinge member 22, a flexure 23, etc. As shown in FIG. 3, the load beam 20 has a proximal portion 30 and a distal end portion 31. A dimple 32 is formed on the distal end portion 31.

Figure 4:
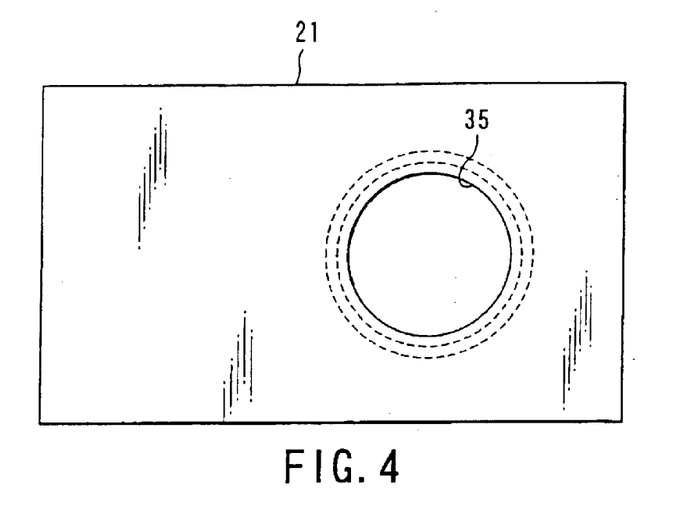
FIG. 4 is a plan view of a base plate of the suspension shown in FIG. 1.

As shown in FIG. 4, a cylindrical boss portion 35 is formed on the base plate 21. The boss portion 35 can be inserted into a mounting hole 36 (shown in FIG. 2) of the actuator arm 14. The base plate 21 is fixed on the actuator arm 14 by caulking (or plastically deforming) the boss portion 35 from inside.

Figure 5:
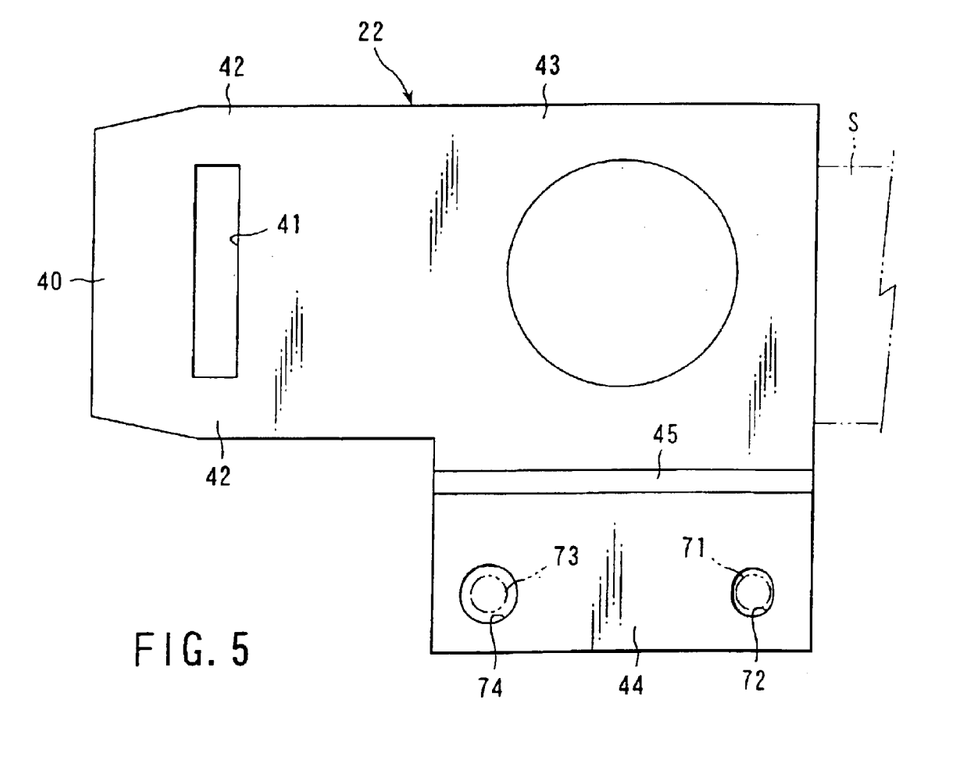
FIG. 5 is a plan view of a hinge member of the suspension shown in FIG. 1.

As shown in FIGS. 1 and 5, the hinge member 22 has an end portion 40, flexible portions 42 elastically deformable in its thickness direction, base plate mounting portion 43, and extending portion 44. The end portion 40 is lapped and fixed on the proximal portion 30 of the load beam 20. The flexible portions 42 are formed individually on the opposite sides of an opening 41. The base plate mounting portion 43 is lapped and fixed on the base plate 21. The extending portion 44 extends sideways from the mounting portion 43.

Figure 7:
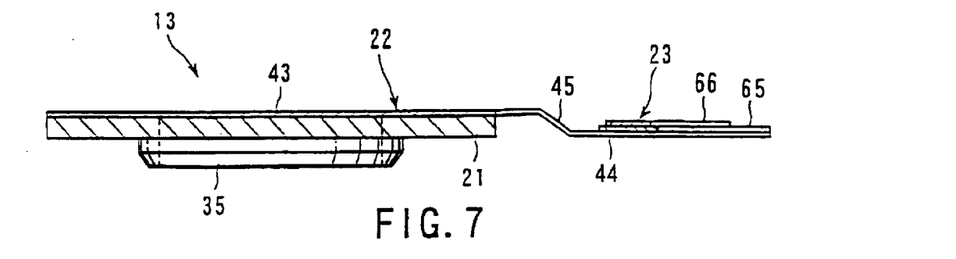
FIG. 7 is a sectional view of the suspension taken along line F7—F7 of FIG. 1.
Figure 8:
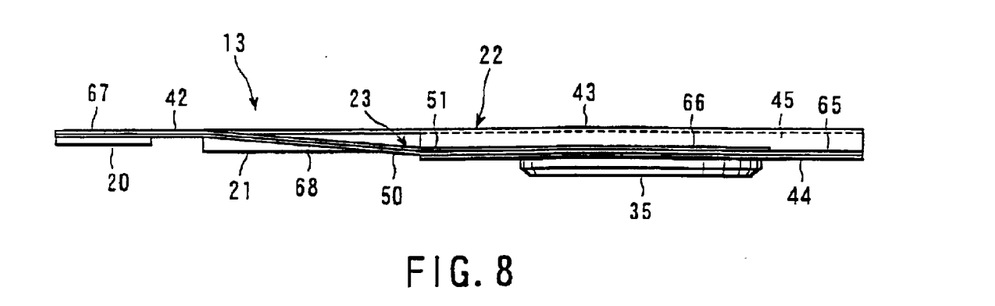
FIG. 8 is a side view of a part of the suspension taken in the direction of arrows F8 of FIG. 1.

As shown in FIGS. 7 and 8, the extending portion 44 of the hinge member 22 is formed having a step forming portion 45 that has a difference in level in the thickness direction. The step forming portion 45 is located near the base plate mounting portion 43.

Figure 6:
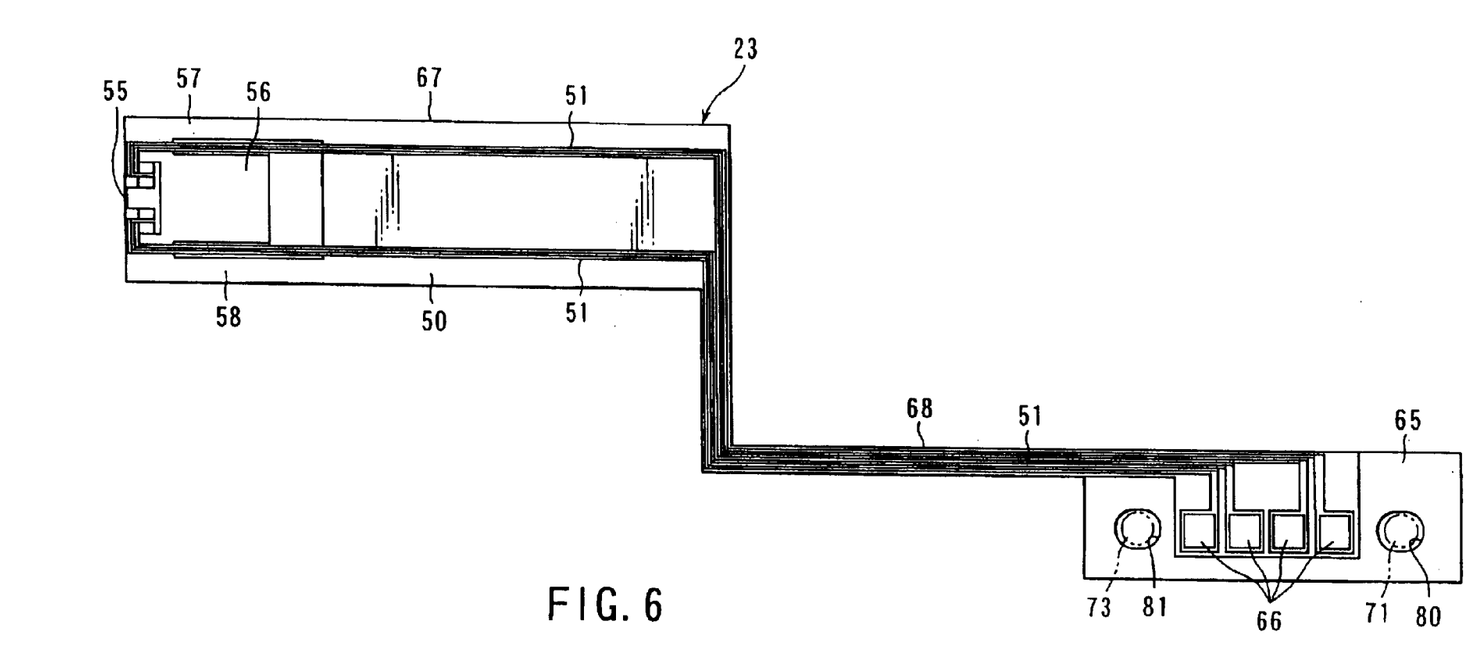
FIG. 6 is a plan view of a flexure of the suspension shown in FIG. 1.

As shown in FIG. 6, the flexure 23 has a metal base 50 and a wiring portion 51. The wiring portion 51 includes a conductive layer that is formed over the surface of the metal base 50 with an electrical insulating layer between them. Thus, the flexure 23 is a so-called wired flexure. The metal base 50 is formed of a metal sheet, e.g., a springy stainless-steel sheet about 18 $\mu$m to 30 $\mu$m thick, as an example of a material that is thinner than the load beam 20. The flexure 23 extends along the load beam 20.

One end portion 55 of the flexure 23 is formed having a tongue portion 56 that functions as a movable part and outrigger portions 57 and 58 that are situated on the opposite sides, right and left, of the tongue portion 56, individually. The tongue portion 56 and the outrigger portions 57 and 58 can bend in the thickness direction of the flexure 23. The tongue portion 56 can engage the dimple 32 on the distal end portion 31 of the load beam 20. A slider 59 (shown in FIG. 2) is mounted on the tongue portion 56. The slider 59 is provided with a transducer (not shown) for use as a magneto-electric transducer element. The transducer, slider 59, etc. constitute the head portion 12.

Electrode pads 66 are provided on the other end portion 65 of the flexure 23. The pads 66 are connected to external lead wires (not shown). The end portion 65 is lapped and fixed on the extending portion 44 of the hinge member 22 by means of fixing means such as laser welding or adhesive bonding. A first intermediate portion 67 and a belt-shaped second intermediate portion 68 are formed between the one and the other end portions 55 and 65 of the flexure 23. The first intermediate portion 67 overlaps the load beam 20. The second intermediate portion 68 is situated off the load beam 20.

Figure 9:
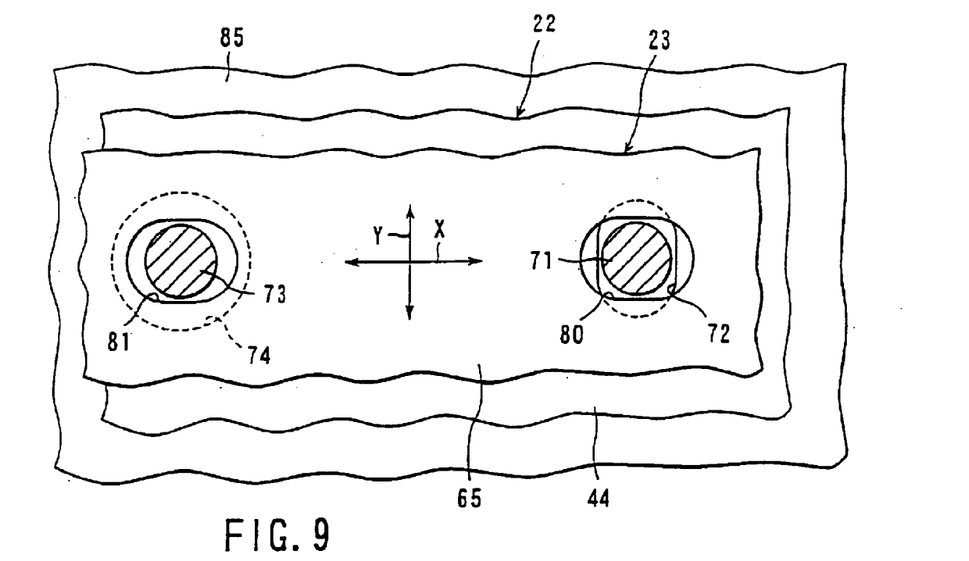
FIG. 9 is a plan view schematically showing a part of the suspension shown in FIG. 1 and a part of a jig.

As shown in FIGS. 5 and 9 and other drawings, the extending portion 44 of the hinge member 22 is formed having first and second holes 72 and 74 that are spaced in an axial direction X. First and second positioning pins 71 and 73 can be inserted into the first and second holes 72 and 74, respectively.

The first hole 72 has an elongated shape. The hole 72 allows the extending portion 44 of the hinge member 22 to move relatively to the first positioning pin 71 for some distance in the width direction Y. The hole 74 is a large-diameter circular hole. The hole 74 allows the extending portion 44 to move relatively to the second positioning pin 73 for some distances in the width direction Y and the axial direction X.

As shown in FIGS. 6 and 9 and other drawings, the end portion 65 of the flexure 23 is formed having third and fourth holes 80 and 81. The holes 80 and 81 are formed in positions spaced in the axial direction X. The first positioning pin 71 can be inserted into the third hole 80. The hole 80 has an elongated shape, which allows the end portion 65 of the flexure 23 to move relatively to the first positioning pin 71 for some distance in the axial direction X.

The second positioning pin 73 can be inserted into the fourth hole 81. The fourth hole 81 also has an elongated shape, which allows the end portion 65 of the flexure 23 to move relatively to the second positioning pin 73 for some distance in the axial direction X.

The first and second positioning pins 71 and 73 are individually provided on a jig body 85 (only a part of which is shown in FIG. 9). The second positioning pin 73 can be moved in the axial direction X by means of an adjusting mechanism (not shown). Thus, the distance between the pins 71 and 73 can be finely adjusted.

A frame portion S (only a part of which is indicated by two-dot chain line in FIG. 5) as a cuttable scrap portion is provided on an end of the hinge member 22. The frame portion S is held in a predetermined position by means of a reference pin (not shown). The reference pin is situated in a position separate from those of the positioning pins 71 and 73. The frame portion S is cut from the hinge member 22 after the flexure 23 is fixed on the hinge member 22.

The intermediate portion 67 of the flexure 23 is fixed on the load beam 20 by laser welding or adhesive bonding. The end portion 65 of the flexure 23 is fixed on the extending portion 44 of the hinge member 22 by laser welding or adhesive bonding. As this is done, the extending portion 44 of the hinge member 22 and the end portion 65 of the flexure 23 are positioned by means of the positioning pins 71 and 73.

The base plate mounting portion 43 of the hinge member 22 is held in a predetermined position on the jig body 85 by means of the frame portion S and the reference pin. As shown in FIG. 9, the first positioning pin 71 is inserted in the first hole 72 of the hinge member 22 and the third hole 80 of the flexure 23.

The second positioning pin 73 is inserted in the second hole 74 of the hinge member 22 and the fourth hole 81 of the flexure 23. The second positioning pin 73 can finely adjust the position of the jig body 85 in the axial direction X. The position of the pin 73 is adjusted so that the pin 73 is situated substantially in the center of the second hole 74.

The position of the extending portion 44 of the hinge member 22 in the axial direction X is regulated by means of the first positioning pin 71 in the first hole 72. Since the extending portion 44 is formed having the step forming portion 45 that is relatively roughly finished, the position of the extending portion 44 may vary in the width direction Y, in some cases. Since the first hole 72 has an elongated shape that extends in the width direction Y of the hinge member 22, however, it can absorb the variation in the width direction Y.

The second hole 74 is a circular hole that has a diameter larger enough than the diameter of the second positioning pin 73. If the accuracy of the extending portion 44 varies owing to the presence of the step forming portion 45, therefore, dislocations of the extending portion 44 in the axial direction X and the width direction Y can be absorbed near the hole 74.

For the flexure 23, on the other hand, the first and second positioning pins 71 and 73 are inserted in the third and fourth holes 80 and 81, respectively. As this is done, the position of the end portion 65 of the flexure 23 in the width direction Y is regulated. The third and fourth holes 80 and 81 have elongated shapes that extend in the axial direction X of the flexure 23. Therefore, the position of the end portion 65 of the flexure 23 in the axial direction X can be regulated. Thus, the end portion 65 can be held in position without producing any excessive stress such as tensile stress in the flexure 23.

For these reasons, the flexure 23 can be prevented from being subjected to excessive stresses, such as tensile, torsional, or compressive stresses when the end portion 65 of the flexure 23 is fixed on the extending portion 44. Thus, these stresses can be prevented from exerting a bad influence upon the rolling angle of the flexure 23, so that the performance of the suspension 13 can be prevented from lowering.

Figure 10:
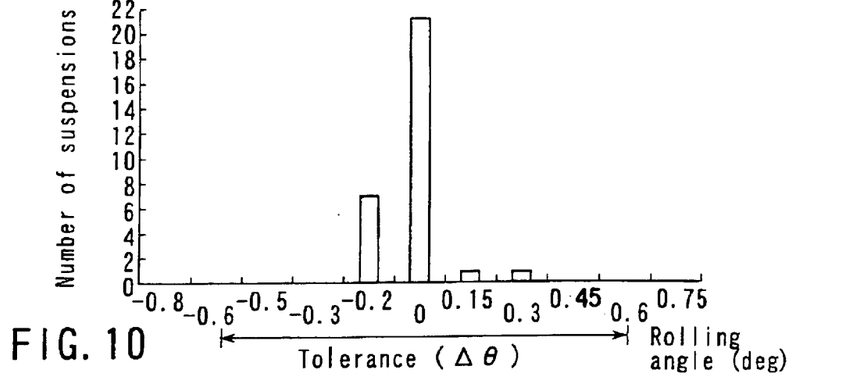
FIG. 10 is a diagram showing the relation between the rolling angle of the suspension shown in FIG. 1 and the number of suspensions.

FIG. 10 shows the result of measurement of the rolling angle of each flexure 23 and the number of suspensions based on thirty manufactured suspensions 13. The respective rolling angles of the suspensions 13 were all within a tolerance ($\Delta\theta$).

Figure 11:
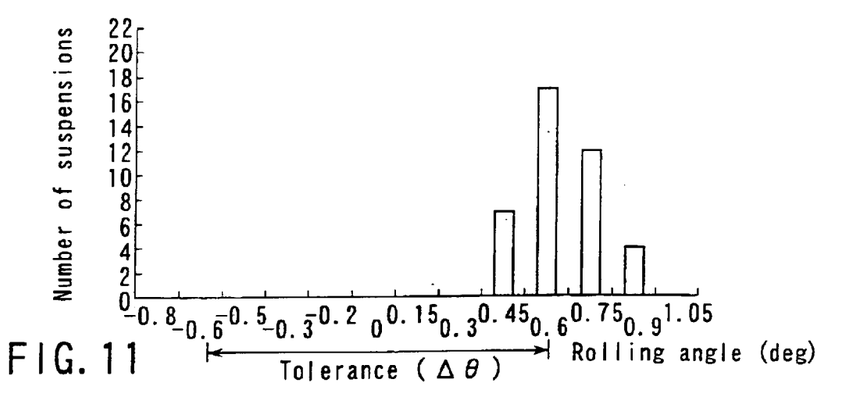
FIG. 11 is a diagram showing the relation between the rolling angle of each suspension as a comparative example and the number of suspensions.

FIG. 11 shows the result of measurement of the rolling angle of each flexure and the number of suspensions based on thirty manufactured suspensions as comparative examples. In these comparative examples, holes that correspond individually to the holes 72, 74, 80 and 81 of the foregoing embodiment are all circular holes. The respective diameters of these circular holes are dimensions such that the positioning pins 71 and 73 are just fitted in the holes. In many of the suspensions of these comparative examples, the rolling angle considerably exceeded the tolerance ($\Delta\theta$).

Figure 12:
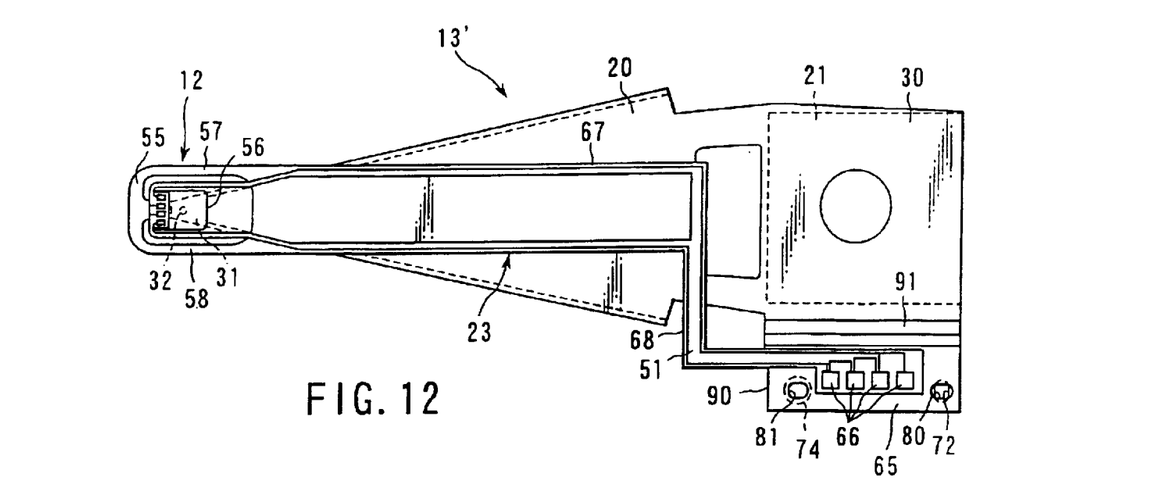
FIG. 12 is a plan view of a suspension according to a second embodiment of the invention.

FIG. 12 shows a suspension 13' according to a second embodiment of the invention. A proximal portion 30 of a load beam 20 of the suspension 13' overlaps a base plate 21. The proximal portion 30 of the load beam 20 is formed having an extending portion 90 and a step forming portion 91. An end portion 65 of a flexure 23 is lapped and fixed on the extending portion 90 by means of laser welding or with an adhesive agent.

The extending portion 90 is formed having first and second holes 72 and 74 that are similar to the ones according to the first embodiment. The end portion 65 of the flexure 23 is formed having third and fourth holes 80 and 81 that are similar to the ones according to the first embodiment. A first positioning pin can be inserted into the first and third holes 72 and 80. A second positioning pin can be inserted into the second and fourth holes 74 and 81. Since the suspension 13' resembles the suspension 13 of the first embodiment for other configurations, functions, and effects, common numerals are used to designate portions that are common to the two suspensions, and a repeated description of the common portions is omitted.

Figure 13:
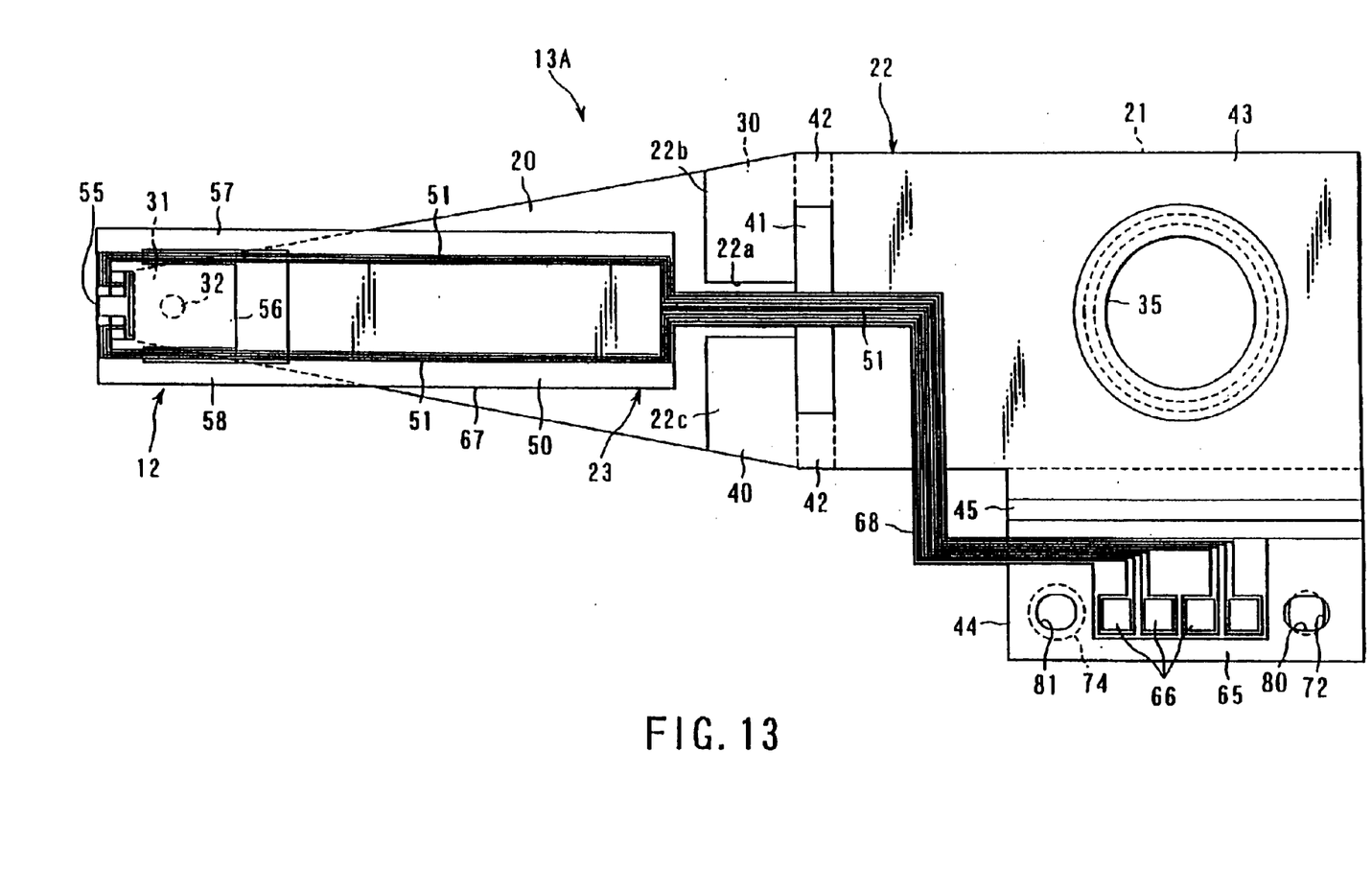
FIG. 13 is a plan view of a suspension according to a third embodiment of the invention.

FIG. 13 shows a suspension 13A according to a third embodiment of the invention. An end portion 40 of a hinge member 22 of the suspension 13A is formed having a slit 22a that extends in the longitudinal direction of the hinge member 22. The slit 22a communicates with an opening 41. Junctions 22b and 22c for connection with the load beam 20 are formed individually on the opposite sides of the slit 22a. A longitudinal part of a flexure 23 is passed through the slit 22a.

The hinge member 22 of the suspension 13A is formed having an extending portion 44 and a step forming portion 45 that are similar to those of the suspension 13 of the first embodiment. An end portion 65 of the flexure 23 is lapped and fixed on the extending portion 44. A longitudinal part of the flexure 23 extends from the base plate mounting portion 43 toward the extending portion 44 through the slit 22a. Since the suspension 13A shares other configurations with the suspension 13 shown in FIG. 1, common numerals are used to designate portions that are common to the two suspensions, and a repeated description of the common portions is omitted.

Figure 14:
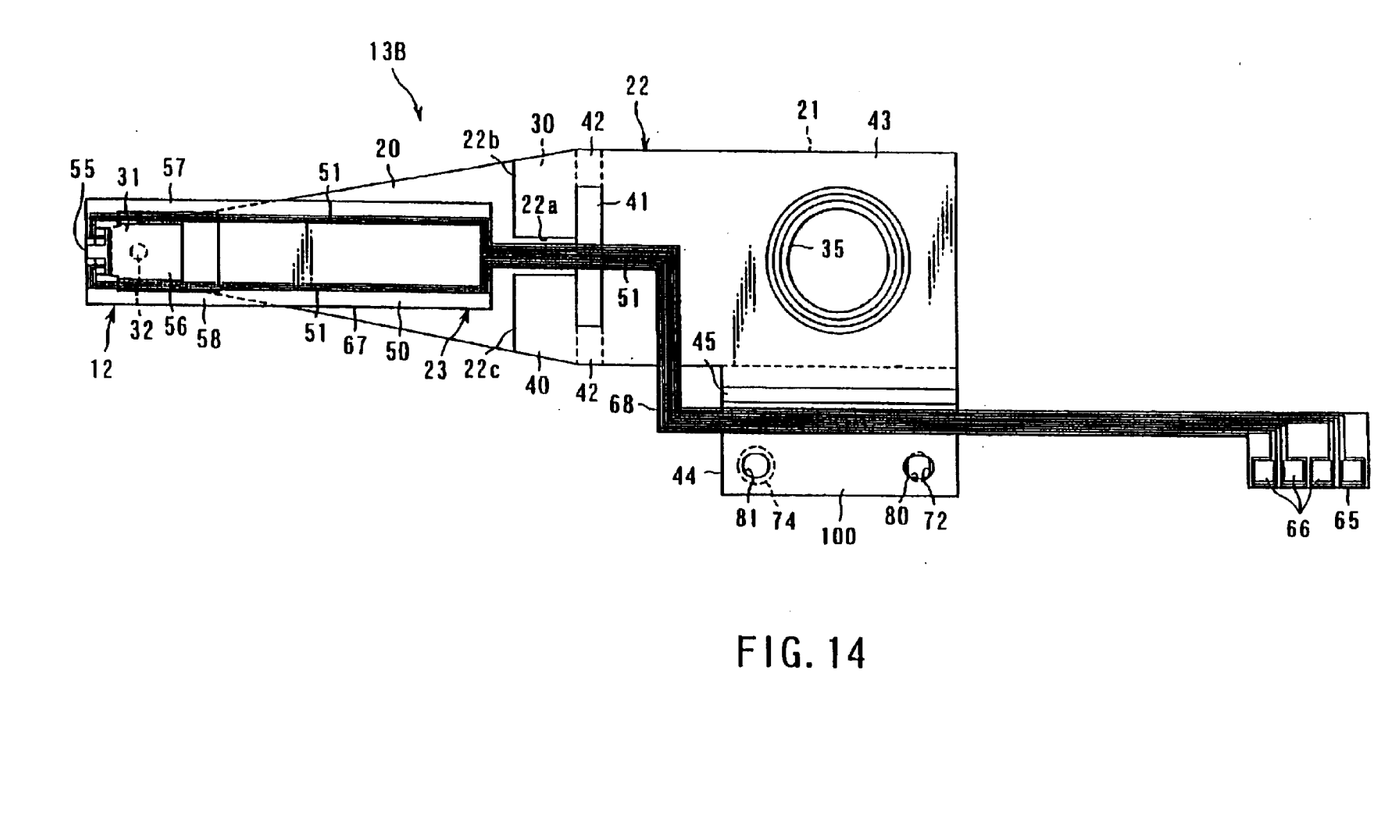
FIG. 14 is a plan view of a suspension according to a fourth embodiment of the invention.

FIG. 14 shows a suspension 13B according to a fourth embodiment of the invention. A hinge member 22 of the suspension 13B is formed having an extending portion 44 and a step forming portion 45 that are similar to those of the suspension 13 of the first embodiment. The extending portion 44 is formed having first and second holes 72 and 74 that are similar to those of the suspension 13 shown in FIG. 1.

A flexure 23 of the suspension 13B has an intermediate portion 100 that is lapped on the extending portion 44. The intermediate portion 100 is formed having third and fourth holes 80 and 81 that are similar to those of the suspension 13 shown in FIG. 1. The intermediate portion 100 is fixed on the extending portion 44. An end portion 65 of the flexure 23 or electrode pads 66 extend rearward from the hinge member 22. Since the suspension 13B shares other configurations with the suspension 13A shown in FIG. 13, common numerals are used to designate portions that are common to the two suspensions, and a repeated description of the common portions is omitted.

Figure 15:
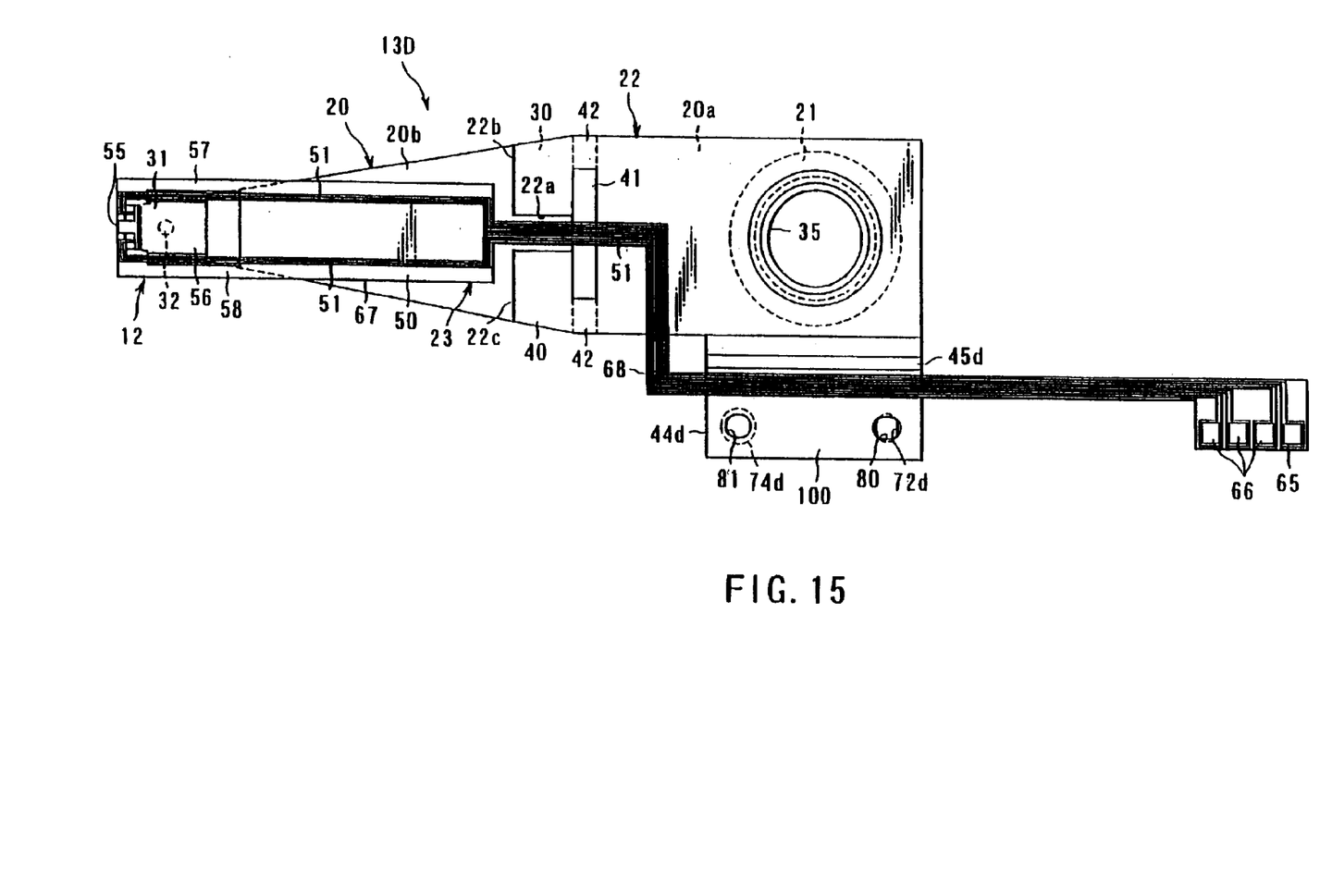
FIG. 15 is a plan view of a suspension according to a fifth embodiment of the invention.

FIG. 15 shows a suspension 13D according to a fifth embodiment of the invention. A load beam 20 of the suspension 13D is provided with a base plate mounting portion 20a and a distal end portion 20b on either side an opening 41. The mounting portion 20a is lapped on a base plate 21, and the distal end portion 20b is situated nearer to a head portion 12. The circular base plate 21 is fixed on the base plate mounting portion 20a.

The base plate mounting portion 20a is formed having a extending portion 44d and a step forming portion 45d. Positioning holes 72d and 74d are formed in the extending portion 44d. The positioning holes 72d and 74d have the same function with the first and second holes 72 and 74 of the suspension 13 shown in FIG. 1. Since the suspension 13D shares other configurations with the suspension 13B shown in FIG. 14, common numerals are used to designate portions that are common to the two suspensions, and a repeated description of the common portions is omitted.

In carrying out the present invention, it is to be understood that the components of the invention, including the positions and shapes of the extending portion and the first to fourth holes, as well as the specific forms of the load beam, hinge member, and flexure, may be variously changed and modified without departing from the scope or spirit of the invention. Further, the invention may be also applied to a suspension that has no step forming portion.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disc drive suspension comprising:
    a load beam including a proximal portion and a distal end portion;
    a flexure fixed or the load beam and including a head portion;
    an extending portion extending sideways from the proximal portion of the load beam and having a part of the flexure fixed thereon;
    an elongated first hole formed in the extending portion, adapted to have a first positioning pin inserted therein, so as to allow the extending portion to move relative to the first positioning pin in a width direction of the extending portion;
    a large-diameter second hole formed in the extending portion adapted to have a second positioning pin therein, so as to allow the extending portion to move relative to the second positioning pin in the width direction and an axial direction of the extending portion;
    an elongated third hole formed in the flexure, adapted to have the first positioning pin inserted therein, so as to allow the flexure to move relative to the first positioning pin in an axial direction of the flexor; and
    an elongated fourth hole formed in the flexure, adapted to have the second positioning pin inserted therein, so as to allow the flexure to move relative to the second positioning pin in the axial direction of the flexure.

2. A disc drive suspension according to claim 1, wherein said extending portion comprises a step forming portion with a difference in level in the thickness direction of the extending portion.

* * * * *